May 23, 1933.    J. C. ANGEL    1,910,196

VALVE FOR FAUCETS

Filed Oct. 21, 1932

INVENTOR
J. C. ANGEL.
BY *Milburn and Milburn*
ATTORNEYS

Patented May 23, 1933

1,910,196

UNITED STATES PATENT OFFICE

JAY C. ANGEL, OF EAST CLEVELAND, OHIO

VALVE FOR FAUCETS

Application filed October 21, 1932. Serial No. 638,855.

This invention relates to the art of valve structures for faucets.

The object of the present invention is to provide an improved valve structure of the general type in which the rotatable valve stem has such operative engagement with the valve member that the rotation of the stem causes a straight-line movement of the valve member during the valve-closing operation, thereby avoiding the wear which would be caused by rotation of the valve member upon the valve seat.

The present improvement resides in the particular structure of the valve member itself which in the present case is in the form of a unitary and permanent assembly of its constituent parts; and there is an improvement also in the particular manner of contactual engagement between the valve stem and the valve member during the closing operation so as to obtain a more positive and dependable seating engagement of the valve.

Another object consists in providing an improved method of assembling the constituent parts of the valve member itself so as to produce a unitary and permanent form of assembly which is free of noise and which is of comparatively low cost and which can therefore be replaced as a complete unit without prohibitive expense.

Other objects will be apparent from the following description and claims when considered together with the accompanying drawing.

Figure 1:
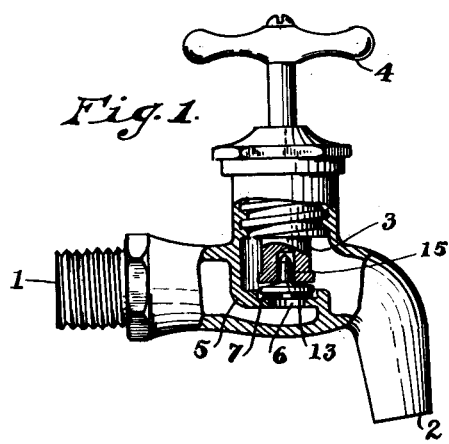
Fig. 1 is a side elevation, partly broken away, of a water faucet and illustrates an installation of my present improved valve structure.
Figure 2:
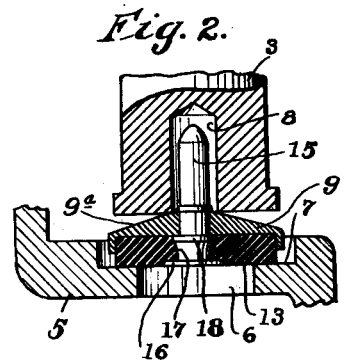
Fig. 2 is an enlarged vertical section of a portion of my improved valve structure and corresponds with that portion which is broken away in Fig. 1.
Figure 5:
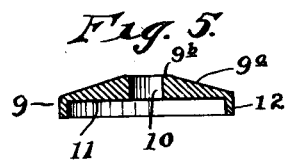
Fig. 5 is a transverse vertical sectional view of the cap member of the valve member.
Figure 3:
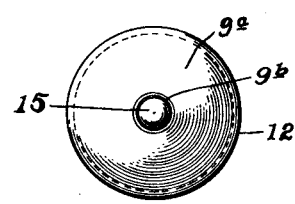
Fig. 3 is a top plan view of the unitary valve member.
Figure 6:
Fig. 6 is a transverse vertical sectional view of the gasket which also forms part of the valve member.
Figure 4:
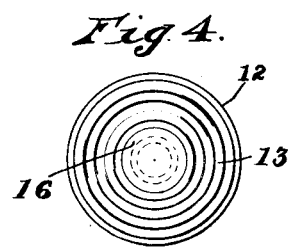
Fig. 4 is a bottom plan view of the unitary valve member.
Figure 7:
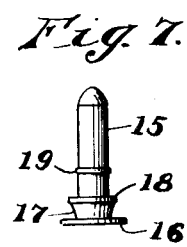
Fig. 7 is an elevation of the pin which secures together the cap and gasket members in the unitary valve member assembly.

The faucet herein illustrated is of the usual conventional form with the inlet end 1 and the outlet end 2. The rotatable valve stem 3 which has threaded engagement in the body of the faucet, is adapted to be given such rotary or turning movement by means of the customary form of handle 4.

The inlet and outlet ends of the faucet are separated by the usual wall or partition 5 through the transversely extending portion of which there is provided the opening 6 and the valve seat 7.

In the present form of invention, the lower end of the valve stem is provided with a bore 8 which extends axially and longitudinally thereof and the lower end of which terminates in an annular form of edge for engagement with the conical portion of the top surface of the valve member unit, as will be more fully explained hereinafter.

The unitary valve member comprises a cap, a gasket and a pin which secures the cap and gasket together. The cap member 9 is formed with a conical upper surface $9^a$ and a centrally disposed restricted flat shoulder $9^b$ which immediately surrounds the opening 10 through the cap. The undersurface 11 of the cap is flat and the cap has the depending annular flange 12, these parts being constructed and arranged so as to receive the circular gasket 13 and to maintain the same within proper lateral extent. The gasket is provided with a centrally disposed aperture 14. This gasket may be formed of hard rubber or any other suitable material. The pin 15 extends through the registering apertures 10 and 14 of the cap and gasket and is provided with suitable means for securing these two elements together so as to produce a unitary form of valve member. The lower end of the pin 15 is provided with a circular flange 16 which engages the underside of the gasket 13. That part of the pin immediately above the flange 16 tapers upwardly and outwardly, as indicated at 17, and terminates in the shoulder 18, this portion being adapted to be received in the aperture of the gasket 13. It should be noted that the distance between the flange 16 and shoulder 18 is of slightly less extent than the thickness of the gasket, for a purpose to be hereinafter explained. The cap member is adapted to be secured in position upon the pin 15 between the shoulder 18 and the shoulder 19, and it is to be understood that the cap may be formed of any suitable metal which is adapted to serve the purposes as herein set forth.

In assembling the gasket and cap members on the pin 15 so as to produce a permanent and unitary assembly thereof, the pin is extended through the registering apertures of the gasket and cap, and that portion of the gasket immediately surrounding the aperture 14 is compressed so as to be forced beneath the shoulder 18, as will be permitted by the tapering portion 17. At the same time, the cap is forced down over the shoulder 19 and the metal of the cap immediately surrounding the aperture 10 is forced under the shoulder 19 and into effective and dependable engagement with the main body of the pin immediately under the shoulder 19.

In this manner, there is produced an effective combination between the pin 15 and the gasket and cap members so that such combination of these elements can be recognized as a unitary assembly.

The upper end portion of the pin 15 is adapted to extend into the bore 8 and, as illustrated in the drawing, the diameter of the pin is less than that of the bore 8 and stops short of the length thereof. As a result, rotation of the valve stem 3 will cause the same to force the valve member downwardly upon the valve seat, this closing of the valve being effected with a straight line movement of the valve member and without any rotary movement of the valve upon its seat. This is due to the free connection between the pin 15 and the bore in the lower end of the valve stem. The only engagement between the valve stem and the valve member consists in the line contact between the annular edge at the lower end of the bore 8 and the conical surface on the upper side of the valve member. These parts are so constructed and arranged that the flat shoulder 9$^b$ is of slightly less diameter than that of the bore 8 so as to insure the line contact engagement between these parts, as just referred to. In this way, there is precluded any danger of the conical surface projecting up inside the bore 8.

As will be understood, closing rotary movement of the valve stem will cause the valve member to settle upon the valve seat 7 so as to close the opening 6 and with my present form of device, there is ensured an automatic adjustment of the valve member upon the seat so as to automatically compensate for any possible irregularities. This universal and automatic adjustment in the settling of the valve member upon its seat is made possible by the line contact between the lower end of the valve stem and the upper side of the valve member, in conjunction with the particular operative relation between the valve member and the valve stem. This particular manner of engagement also serves as a means of centering the valve member with respect to the valve stem and likewise with respect to the opening in the valve seat.

It is to be understood also that upon rotation of the valve stem 3 in the reverse direction so as to permit opening of the valve, the force of the water supply through the faucet will cause the valve member to rise and to follow the upward movement of the valve stem so as to maintain these parts in operative relation.

Figures 8, 9:
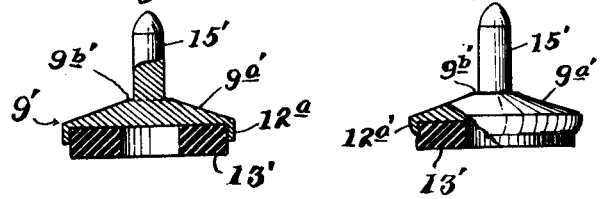
Fig. 8 is a view which for the most part is broken away and illustrates a modified form of unitary valve member in its preliminary stage of assembly.
Fig. 9 is an elevation, with part broken away, of the completed form of unitary valve member resulting from the initial stage of assembly illustrated in Fig. 8.

In the modification illustrated in Figs. 8 and 9, the cap member 9′ and pin 15′ are shown as being formed as a single integral part. In this modified form, the gasket is first placed within the flange 12$^a$ of the cap member (see Fig. 8), which is then spun inwardly into secure engagement with the outer edge of the gasket 13′ so as to constitute a unitary valve member, as illustrated at 12$^{a\prime}$ in Fig. 9. This modified form of valve member has the conical portion 9$^{a\prime}$ and the flat central portion 9$^{b\prime}$ and is intended for use in the same manner as the first form of valve member illustrated herein and has the same cooperation with the valve stem as already described in connection with the first form of my present invention.

Besides the automatic, universal settling of the valve upon its seat, due to the line contact between the valve stem and the valve member, as above explained, this particular feature possesses a still further advantage. Owing to this line contact engagement, there is reduced to a minimum any danger of the valve member being dragged around by the rotatable movement of the valve stem as might otherwise be caused by a relatively extended surface engagement between the valve stem and the valve member, that is as compared to the extent of engagement between the valve member and the valve seat.

By virtue of the particular assembly of the valve member and its particular manner of cooperation with the valve stem, there is considerably less wear upon the parts, and the danger of noise which might otherwise result from the looseness between any of the parts is reduced to a minimum.

In addition to other advantages possessed by the present improved form of valve structure, as hereinbefore referred to, there results also another advantage due to the comparative simplicity of construction of the valve member and the resultant comparatively low cost to the ultimate consumer. That is, with the present construction, it is possible to discard the entire valve member should occasion require, and there can be installed a new valve member in its entirety. Consequently, there is avoided any danger of noise due to looseness between the several parts of the valve member which might result from continued use of the same after becoming worn or as might result also from a substitution of a single new part for one of the several constituent parts of the valve member assembly.

By virtue of the particular construction and manner of operation, the present improved form of valve member is characterized by a comparatively long life, and the cost is such that replacement of the entire assembly is not prohibitive.

Other advantages will be apparent to those who are familiar with the art to which the present invention relates.

It is to be understood that the present form of disclosure is merely for purposes of illustration and that there may be devised various modifications without departing from the spirit of the present invention as herein set forth and that all such modifications are intended to be comprehended by the following claims.

What I claim is:

1. In a valve structure, the combination of a rotatable stem having an axially disposed and longitudinally extending substantially cylindrical bore in the lower end thereof, the mouth of said bore being defined by a substantially annular edge for engagement with the companion valve member, and a unitary valve member comprising a pin, cap and gasket, the pin extending upwardly through said gasket and cap and securing the same together as a unit, that part of the pin above the cap extending into said bore and being of smaller diameter than said bore and terminating short of the end thereof, and the cap having its top formed with a conical surface for engagement by said annular edge of the valve stem, thereby affording a line contact engagement between the stem and valve member for effective closing of the valve.

2. In a valve structure, the combination of a rotatable stem having an axially disposed and longitudinally extending substantially cylindrical bore in the lower end thereof, and a unitary valve member comprising a pin, cap and gasket, the pin extending upwardly through said gasket and cap and having means for securing the same together as a unit, that part of the pin above the cap extending into said bore and being of smaller diameter than said bore and terminating short of the end thereof, and the cap having a depending flange surrounding said gasket.

3. In a valve structure, the combination of a rotatable stem having an axially disposed and longitudinally extending substantially cylindrical bore in the lower end thereof, the mouth of said bore being defined by a substantially annular edge for engagement with the companion valve member, and a unitary valve member comprising a pin, cap and gasket, the pin extending upwardly through said gasket and cap and securing the same together as a unit, that part of the pin above the cap extending into said bore and being of smaller diameter than said bore and terminating short of the end thereof, and the cap having its top formed with a conical surface for engagement by said annular edge of the valve stem, thereby affording a line contact engagement between the stem and valve member for effective closing of the valve, and said cap having a flat undersurface to accommodate the correspondingly formed gasket and having a depending flange surrounding said gasket.

4. In a valve structure, the combination of a rotatable stem having an axially disposed and longitudinally extending bore in the lower end thereof and a unitary valve member comprising a pin, cap and gasket, the pin extending upwardly through said gasket and cap and being formed with annular shoulders for securing the gasket and cap in unitary assembly, that part of the pin above the cap extending into said bore and being of smaller diameter than said bore and terminating short of the end thereof, and the cap having its top formed with a suitable surface for engagement by the lower end of said stem for closing the valve.

5. In a valve structure, the combination of a rotatable stem having an axially disposed and longitudinally extending bore in the lower end thereof, and a unitary valve member comprising a pin, cap and gasket, the pin extending upwardly through said gasket and cap and being formed at its lower end with a flange to engage the lower side of the gasket and being formed also with spaced shoulders thereabove for engaging the upper sides of the gasket and cap respectively, whereby said pin, gasket and cap are secured together as a unitary assembly, that part of the pin above the cap extending into said bore and being of smaller diameter than said bore and terminating short of the end thereof, and the cap having its top formed with a suitable surface for engagement by the lower end of said stem for closing the valve.

6. In a valve structure, the combination of a rotatable stem having an axially disposed and longitudinally extending substantially cylindrical bore in the lower end thereof, the mouth of said bore being defined by a substantially annular edge for engagement with the companion valve member, and a unitary valve member comprising a pin, cap and gasket, the pin extending upwardly through said gasket and cap and being formed at its lower end with a flange to engage the lower side of the gasket and being formed also with spaced annular shoulders thereabove for engaging the upper sides of the gasket and cap respectively, whereby said pin, gasket, and cap are secured together as a unitary assembly, that part of the pin above the cap extending into said bore and being of smaller diameter than said bore and terminating short of the end thereof, and the cap having its top formed with a conical surface for engagement by said annular edge of the valve stem, thereby affording a line contact engagement between the stem and valve member for effective closing of the valve, and said cap having a depending flange surrounding said gasket.

7. In a device of the class described, the method of producing a valve member which consists in extending a pin through a circular gasket, compressing the central portion of the gasket so as to engage the same between a shoulder and a flange on the pin, and securing an apertured cap in position over the gasket by forcing the same over a shoulder on the pin and forcing that portion of the cap bordering its aperture under its shoulder.

8. In a device of the class described, a unitary valve member comprising a pin, cap and gasket, the pin extending through centrally disposed openings in said cap and gasket and having an enlargement at its one end to support the gasket and having also spaced annular shoulders thereabove for engaging the upper sides of the gasket and cap, respectively, whereby said pin, gasket and cap are secured together as a unitary assembly, the pin extending above the cap and being adapted for free engagement within a bored valve stem, the cap having its top surface formed with a conical portion for engagement by the valve stem and having a depending flange surrounding the margin of the gasket so as to confine the same within proper lateral extent.

In testimony whereof, I hereby affix my signature.

JAY C. ANGEL.